(12) United States Patent
Kortschack et al.

(10) Patent No.: US 11,528,917 B2
(45) Date of Patent: *Dec. 20, 2022

(54) METHOD FOR TREATING A FOOD PRODUCT BY MEANS OF NON-CONVENTIONAL RESISTIVE HEATING

(71) Applicant: Fritz Kortschack, Oldenburg (DE)

(72) Inventors: Fritz Kortschack, Oldenburg (DE); Kevin Eberhardt, Sachsen bei Ansbach (DE)

(73) Assignee: Fritz Kortschack, Oldenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/959,974

(22) PCT Filed: Dec. 20, 2018

(86) PCT No.: PCT/EP2018/086035
§ 371 (c)(1),
(2) Date: Jul. 2, 2020

(87) PCT Pub. No.: WO2019/134837
PCT Pub. Date: Jul. 11, 2019

(65) Prior Publication Data
US 2020/0359639 A1    Nov. 19, 2020

(30) Foreign Application Priority Data

Jan. 4, 2018  (DE) .......................... 102018100128.2
May 2, 2018  (DE) .......................... 102018110483.9

(51) Int. Cl.
*A23B 4/01*    (2006.01)
*A23L 5/10*    (2016.01)
(Continued)

(52) U.S. Cl.
CPC ................ *A23B 4/01* (2013.01); *A22C 13/00* (2013.01); *A22C 15/001* (2013.01); *A23L 5/15* (2016.08);
(Continued)

(58) Field of Classification Search
CPC ......... A23L 3/005; A23L 5/15; A22C 15/001; B65G 15/14; B65G 2201/0202;
(Continued)

(56) References Cited

U.S. PATENT DOCUMENTS

| | | | | | |
|---|---|---|---|---|---|
| 2,022,940 A | * | 12/1935 | Persiani | ............... | H05B 3/0004 99/342 |
| 2,605,377 A | * | 7/1952 | Kaehni | .................. | F28F 13/16 392/466 |

(Continued)

FOREIGN PATENT DOCUMENTS

| | | | | |
|---|---|---|---|---|
| CN | 1961987 A | * | 5/2007 | |
| CN | 101999692 A | * | 4/2011 | |

(Continued)

OTHER PUBLICATIONS

Gabriel Piette, et al, "Is there a Future for OH-MIC Cooking in Meat Processing?", May 31, 2001, URL http://cmsa-ascv.ca/documents/2001May-1Piettepgs8-10.pdf, May 31, 2001, 3 pages.

*Primary Examiner* — Drew E Becker
*Assistant Examiner* — Austin Parker Taylor
(74) *Attorney, Agent, or Firm* — Cesari and McKenna, LLP

(57) ABSTRACT

The invention relates to a method for treating a food product by non-conventional resistive heating using. contact with spaced-apart electrically conductive electrodes connected to a power source that regulates current to the electrodes by pausing heating of the food product to a predetermined temperature. The electrodes are configured into two groups (Continued)

at a first distance from one another. Each electrode group has individual electrodes, similar to a comb-like set of needles, wherein neighboring needles of each group are at a second distance from one another that is greater than or equal to the first distance. Each set of needles penetrates the food product such that points of the needles leave penetration points, wherein the food product is accommodated in a space between two conveyor belts and the individual electrodes extend from at least one of the conveyor belts in the direction of the opposite conveyor belt.

19 Claims, 5 Drawing Sheets

(51) Int. Cl.
    *A22C 13/00*            (2006.01)
    *A22C 15/00*            (2006.01)
    *B65G 15/14*            (2006.01)
    *B65G 15/42*            (2006.01)
    *H05B 1/02*             (2006.01)
    *H05B 3/00*             (2006.01)
    *H05B 3/03*             (2006.01)
    *H05B 3/14*             (2006.01)

(52) U.S. Cl.
    CPC ............ *B65G 15/14* (2013.01); *B65G 15/42* (2013.01); *H05B 1/0261* (2013.01); *H05B 3/0023* (2013.01); *H05B 3/03* (2013.01); *H05B 3/146* (2013.01); *A23V 2002/00* (2013.01); *B65G 2201/0202* (2013.01)

(58) Field of Classification Search
    CPC .... B65G 15/42; H05B 1/0261; H05B 3/0023; H05B 3/03; H05B 3/146; H05B 1/0258–0266; H05B 3/00; H05B 3/0071; H05B 3/0076; A23V 2002/00; A23B 4/01–015

USPC .................................................. 426/244–247
See application file for complete search history.

(56) References Cited

U.S. PATENT DOCUMENTS

| | | | | |
|---|---|---|---|---|
| 2,623,451 | A * | 12/1952 | Prohaska | A22C 11/003 99/352 |
| 2,642,794 | A * | 6/1953 | Spiess | H05B 3/0004 99/358 |
| 2,895,405 | A | 7/1959 | Hopkins | |
| 3,368,059 | A * | 2/1968 | Scott | B23K 11/20 219/118 |
| 5,447,534 | A * | 9/1995 | Jammet | A61N 1/0573 607/127 |
| 6,303,166 | B1 * | 10/2001 | Kolbe | A23B 4/01 219/771 |
| 6,737,093 | B1 * | 5/2004 | Kortschack | A23L 13/60 426/238 |
| 8,487,222 | B2 * | 7/2013 | Yamada | A23L 5/15 219/541 |
| 2007/0280655 | A1 * | 12/2007 | Chaput | F24C 7/043 392/436 |
| 2013/0133294 | A1 * | 5/2013 | Kortschack | A22C 17/0093 53/461 |
| 2016/0183543 | A1 * | 6/2016 | Kortschack | A23L 5/15 426/234 |

FOREIGN PATENT DOCUMENTS

| | | | | |
|---|---|---|---|---|
| DE | 1540909 | A1 * | 11/1970 | ......... H05B 3/0004 |
| DE | 102014010166 | A1 | 2/2015 | |
| DE | 102015206385 | A1 | 10/2016 | |
| DE | 202016104649 | U1 * | 8/2017 | ......... A22C 13/0009 |
| EP | 2175693 | A1 | 4/2010 | |
| JP | H1014507 | A * | 1/1998 | |
| JP | 2010238639 | A * | 10/2010 | |
| JP | 2012115260 | | 6/2012 | |
| JP | 2015159734 | A * | 9/2015 | |
| SU | 1251841 | A1 * | 8/1986 | |
| WO | WO-2018091557 | A1 | 5/2018 | |

\* cited by examiner

METHOD FOR TREATING A FOOD PRODUCT BY MEANS OF NON-CONVENTIONAL RESISTIVE HEATING

CROSS REFERENCE TO RELATED APPLICATIONS

This application is the National Stage of International Application No. PCT/EP2018/086035, filed Dec. 20, 2018, which claims the benefit of German Patent Application No. 102018100128.2 filed on Jan. 4, 2018 and German Patent Application No. 102018110483.9 filed May 2, 2018. The contents of all applications are hereby incorporated by reference in their entirety.

BACKGROUND

From DE 1 540 909 A, a device for the electrical fast heating of food products is already known, wherein the heating is performed by an axial passage of normal frequency alternating current. The alternating current is introduced by contacts at the ends or front sides of the elongate food product to be treated. The sheathing of the food product, which is in this respect non-conductive or poorly conductive, is penetrated. The employed electrodes may have spike-shaped or cutter-shaped protrusions at the contact surfaces so that the sheathing mentioned above can be pierced more easily.

In the device for heating food products according to DE 10 2015 206 385 A1, the main focus is preferably the treatment of encased products, in particular meat and sausage products. By means of the already known teaching, fast heating of the encased food product is intended to be realized by uniformly applying electric current which generates heat within the food product.

In this respect, the device has at least two spaced-apart axially parallel and co-rotatable cylindrical electrodes, which are in contact with terminals of opposite polarity of an electrical power source and are in electrical contact with the sheathing, wherein the electrodes rotate at the sheathing. The sheathing preferably has a longitudinal axis arranged in parallel to the longitudinal axes of the electrodes so that the at least two electrodes rotate axially parallel to the sheathing.

The current source according to DE 10 2015 206 385 A1 provides alternating current of a frequency in the range from 2 kHz to 300 MHz.

The generic DE 10 2014 010 166 A1 relates to a method for treating a food product by heating. A non-conventional resistive heating is employed in this case. The functional principle of the resistive heating is based on directly passing current through the product. During this, the food product quasi adopts the function of a resistor.

In the method according to DE 10 2014 010 166 A1, a dimensionally stable sheathing or a sheathing made dimensionally stable by further means, which is made of non-conductive material, is first filled with a filling material. This may be in particular be sausage meat or a similar foodstuff raw material. Following this, the openings of the sheathing are closed with conducting surfaces, in particular plates or plugs. An introduction of the electrical current is performed via the conducting surfaces for the purpose of resistive heating.

In a configuration of the teaching therein, there is the possibility of executing the current application of the material to be treated in intervals. Accordingly, an energization interval is followed by a rest interval for equalizing the temperature in the product. The respective duration of the intervals may be selected based on the respective product characteristics, for example the heat conductivity or electrical conductivity.

In an implementation according to DE 10 2014 010 166 A1, the material to be treated may be divided in sections within the casing by conductive barriers, for example discs of a conducting material. These conductive barriers result in the current flow being homogenized and thus the resistive heating to be equalized. A product heated in such a manner may be removed easily from the dimensionally stable casing and easily be cut into slices.

Raw sausage mass which is filled into corresponding cartridges even in a very cold state, may be further compacted permanently by closures and pressure.

The mentioned dimensionally stable sheathing may at the same time be utilized as a non-contaminating package, in particular transport package for the finished product.

Although the described methods already show very good results in the treatment of food products by resistive heating, there is the problem that air inclusions develop during the heating process in particular in the case of large-area contacts or gases are released during heating forming an insulating layer directly in front of the contact surface so that the heating progresses in a non-uniform manner, which might result in disorders in the production process during the production of corresponding food products. It is true that this effect may be reduced with the idea of generating a relative movement between the filling material, i.e. the food material to be treated, and the conducting surfaces, but the effort for generating such a relative movement is considerable.

BRIEF SUMMARY

The intervention relates to a method for treating a food product by means of non-conventional resistive heating, for heating material to be treated, in particular raw material accommodated in a sheathing for producing food products such as Brühwurst (scalded sausage), hot dogs or similar products, wherein the respective food product is brought into contact with spaced-apart electrically conductive electrodes, and the electrodes are connected to a controllable or regulatable power source according to the preamble of claim 1.

From the aforementioned, it is therefore a task of the invention to propose a further developed method for treating a food product by means of resistive heating, which does no longer have the depicted disadvantages of the state of the art and is suitable for continuous industrial production.

The solution of the task of the invention is performed by a method in accordance with the teaching according to claim 1, with the dependent claims comprising at least appropriate configurations and further developments.

The method according to the invention is based on resistive heating known as such, and is related to food products in particular accommodated within an insulating encapsulation or sheathing. The sheathing may be an intestine, for example. As a support, the insulating encapsulation may comprise individual shape molds, shape mold groups, cylindrical casings, tapes or other casing configurations of any cross section.

The food products to be treated are in particular sausage products such as scalded sausage, hot dogs, reconstituted meat or similar products.

For the respective method, the electrodes respectively are formed as at least one first and one second electrodes or electrode group.

The electrodes have a distance $A_{EG}$ from one another.

In electrode groups, in turn each group has a number of individual electrodes similar to a comb-like set of needles or a comb-like set of brushes, wherein the adjacent individual electrodes of the comb-like set of needles each have a distance $A_{EE}$.

In this case, the distance $A_{EG}$ is greater than or at most equal to the distance $A_{EE}$.

The respective electrodes penetrate into the in particular insulating encapsulation or sheathing and pierce the food product in such a way that, based on the food product and the encapsulation or sheathing, inlet, docking or outlet points for the comb-like set of needles are produced.

The individual electrodes of the comb-like set of needles or the needle comb electrode are realized to be substantially in parallel to one another. Each single electrode may have a sharp point for puncturing. This may be, for example, embodied as a bevel. However, it is also possible for the electrodes having rounded or bevelled ends to be introduced into the sheathing through the material to be treated up to the opposite sheathing wall by means of a placeholder, e.g. a partially ground small tube, wherein it must be ensured that the ends of the electrodes lay flat against the opposite inner wall of the sheathing.

According to the invention, the current source is activated only when all or the major number of the individual electrodes have reached their (exit point) end position, i.e. the food product has been pierced completely.

In a sausage product, for example accommodated in a flexible casing, the respective electrode groups preferably are pricked in the end area of the casing and a corresponding puncture is produced there. Exerting a pressing force in the longitudinal direction of the sausage product allows an at least end-side compaction of the sausage product to be realized and an undesired cap formation at the casing ends to be prevented.

After the removal of the respective electrode group from the treated foodstuff by the effect of tensile or compressive force, the remaining inlet and penetration points on the casing or the sheathing may be closed.

This closing may be performed, for example, by spraying with a food-compatible fluid plastic, by gluing, covering or by applying a coating-like partial sheathing.

For the purpose of closing, resetting, self-healing film materials are particularly suitable. In this case, the material of the synthetic casing may already be composed of such a self-healing film material or have self-healing properties in the areas where the penetration should take place.

The initially mentioned power source for generating electrical energy provides high-frequency energy. The controllability of the energy source ensures that undesired hot spots will not be generated in the foodstuff during the resistive heating, with a pulse-like current application being also possible with control of a maximum current intensity to be complied with.

After the resistive heating, there is the option for the purpose of further decontamination to post-heat the corresponding product in a conventional way, for example, a water bath can be made or a treatment with hot steam can be performed. As a complement, a treatment by means of infrared radiation may likewise be performed.

In a further development of the invention, the individual electrodes are realized to be rotatable or movable about their axes. During penetration, the individual electrodes can make a rotational movement, whereas during the removal of the individual electrodes, a respective directionally changed rotational movement takes place. Due to this penetration by means of a rotational movement, the puncture or penetration site relative to the sheathing is realized to be minimally invasive so that the effort during reclosing is reduced.

In a further development of the invention, the individual electrodes may be realized as hollow electrodes. The hollow electrode space may then serve to accommodate a heating agent or cooling agent or have a heating core or cooling core of high thermal conductivity. At least one of the electrodes may have an integrated temperature sensor.

It should be noted at this point that the introduction of the electrodes with respect to an elongate material to be treated, for example a hot dog, is performed in a substantially oblique up to rectangular manner to the longitudinal axis of the material to be treated.

In a further development of the invention, the individual electrodes may be introduced such that a so-called grid electrode is formed in at least one electrode group. This means that a first electrode comb is pierced into the food product and the sheathing. A second electrode comb is then likewise pierced in at the same location but at an angular offset. If the developed structure is then analyzed in an imaginary viewing direction, it is represented as a grid electrode.

In a further development of the invention, the insulating encapsulation may be composed of (half) shells which accommodate the food product, wherein, prior to the intrusion of the electrodes, the (half) shells are moved toward one another in a shaping manner with respect to the food product. This moving toward one another allows the food product to be shaped and compacted. The food product is not required to be supplied to the shells in a sheathing, rather the product may be shaped and compacted in the shells as a mass before the heating is performed via the (puncturing) piercing electrodes by means of resistive heating. Possible air inclusions can be removed, to which purpose the openings for puncturing present at the opposite ends of the half shells may in particular be utilized. The shells may be arranged as a chain or as components of a continuous production conveyor belt or mat. After the treatment by means of the resistive heating, the shells are again driven apart and the heated and shaped food products are withdrawn for possible further treatment.

In a configuration of the invention, there is the option to perform the penetration or puncture of the food product or the sheathing by needles in a manner supported by ultrasound.

The teaching according to the invention moreover is based on the idea of focusing to a continuous or line production.

The product itself to be treated is supplied to a device composed of two spaced-apart conveyor belts.

The still untreated raw materials possibly present in a casing, are received within the gap space. Tappets extending from at least one conveyor belt toward the gap space between the conveyor belts, form a separation between the individual portions (sausages) and enable a safe transport of goods over the length of the conveyor belts. The electrodes penetrate into the respective sheathing and pass through the material to be treated so that over the period of covering the transport distance, the desired resistive heating can take place. By means of controlling the transport speed, the retention time and thus the treatment time may be predefined.

The tappets may also be shaped parts corresponding to a defined contour for shaping the material to be treated, and may be formed correspondingly.

A further continuous treatment method may be implemented such that the material to be treated is injected in a predefined width between non-conductive, synchronously running upper or lower belts that are provided with troughs, if necessary.

As cross dividers, shaped parts—for shaping the product ends—having product properties explained later can be used. The material to be treated forms a homogenous surface between the belts, which is only interrupted by the transverse shaped parts or are limited in length. In the further course of the movement of the belt, non-conductive delimiting walls are introduced in a positive fit with the shaped parts—due to the belts, thin partitions are applied between the upper and lower belts in such a manner that an elongate consumer good is present in the respective interspace between the left and right partitions and the delimiting shaped parts. The desired pressure to be applied may be generated by driving the upper and lower belts together. Starting from the center of the shaped parts, the material to be treated can be brought to the desired temperature via electrodes by means of resistive heating in an extremely short time.

Between the mentioned synchronously running upper and lower belts and the material to be treated, a reusable foil, for example of a silicone material, or a synchronously running disposable foil may be inserted. Apart from quasi flexible upper or lower belts, solid molds may also be used.

Irrespective of the advantages according to the method, inhomogeneities in heating the material to be treated might cause locally high or locally low temperatures (hot spots, cold spots) to be formed. Due to different electrical conductivities of single product sections or due to irregular distribution of the electric field, inhomogeneities including the previously mentioned hot spots or cold spots arise during resistive heating. Specially disperse systems having aqueous or oily or particulate fractions exhibit differences in conductivity causing differences in the temperature increase of the respective phase.

In order to encounter this problem, the proposal according to the invention is to divide the process of heating into sections or temporal blocks so that the possibly built cold spots or hot spots may conform to one another. It is thus possible to perform a pulse heating to, for example, up to 50° C. of the material to be treated. Thereafter, an interruption of the energization is performed so that the protein net may form more solid structures. In the next step, heating to about 60° C. is performed. Within a new treatment pause, the protein net reaches higher stability. Subsequently, a further heat treatment up to the desired final temperature takes place. By perforating or destroying cell membranes during resistive heating, a combination of intracellular liquids and extracellular liquids occurs. This results in a higher water binding capacity with the consequence of a lower jelly deposit. This in turn reduces the survival rate of microorganisms due to the damage of the cell membranes, which is advantageous for the shelf life of the thus treated foodstuff.

A further advantage of the interruption of the heating at a relatively low temperature as explained above is the fact that the gas present in the material to be treated, for example sausage meat, especially at counter-pressure does not yet expand at 50° C. so strongly that the slowly solidifying protein matrix will be ruptured. As already depicted, the protein grid may further solidify, i.e. coagulate, during the treatment pauses promoted by the reached temperature. During the subsequent further temperature treatment, trapped gas is kept fixed in its original position. If the heating is too fast, however, the trapped gas might expand explosively and/or connect to other gases before the protein matrix has solidified sufficiently strongly. This causes larger air inclusions to be formed with the corresponding disadvantage effects upon the material to be treated.

The degree of drying in the area of edge zones of the material to be treated is also reduced by the stepwise treatment.

If during the treatment of the product, an insufficient shrinkage of casings employed as sheathings occurs, there is the option to clamp the not yet treated but filled casing between two or more half or quarter shells which are components of the respective conveyor belt. The ends the half or quarter shells then will have holes through which the comb electrodes or puncture electrodes can be introduced. An additional plug with correspondingly realized recesses coinciding exactly in their end position with the puncture openings in the half shells, is capable of increasing the pressure upon the material to be treated so as reduce possibly present cavities. After completion of the resistive heating according to the invention, the sausage meat will be solidified to an extent that, after opening the half or quarter shells, the heated product can be withdrawn and post-treated in a known manner. This ensures that even very priceworthy artificial sausage skins can be used for sheathing. When electrodes are used which are able of accommodating an integrated temperature sensor, the heating during the heating process can be determined, the core temperature be obtained and be taken as a control variable.

Quite basically, the solution according to the invention may also be utilized for treating raw sausage meats in cartridges, when the possibility of introducing the electrodes according to the invention is created.

For shaping ends or caps, resistance-adjusted liquids, gelatinous masses or substances (buffer material) having these characteristics, may be positioned, for example as shaped parts in front of the electrodes. Between the treatment product to be heated and the resistance-adjusted buffer material, a water-permeable and current-permeable mold or membrane is introduced, which ensures that the product ends adopt the desired shape. This device enables the energization of the treatment product to be performed uniformly even at bulges and the desired geometries to be realized.

Especially for producing small-sized products such as, for example, sausages, bratwurst, etc., it is desirable for a continuous production to be realized. This can be achieved in that within shaped belts or pipes, via tappets which can simultaneously function as contacts of current-permeable molds or membranes, the heat treatment by means of resistive heating is performed. According to the invention, its is also possible to perform before or behind the respective tappets, between the "left" or the "right" membrane, the resistive heating into the buffer material or the current-permeable mold via puncture electrodes. For achieving desired cap geometries, the molds have or the buffer material has an electrical resistor between the "left" and the "right" membrane which enables parallel energization of the material to be treated despite the "cap formation".

The distances of the tappets and the diameters of the shaped belts or pipes are to be adapted to the respective requirements related to the product size and also serve for lengthwise portioning.

For preventing heat from being emitted through the mass to be treated, the shaped belts or pipes can be heated from outside and/or be realized in a thermally isolating manner. The tappets within the pipes can be moved via internal but also external towing devices.

The material for the electrodes or electrode groups must comply with the relevant provisions of foodstuff technology and should be easy to clean. For preventing contaminations, there is the option of providing the electrodes with an antibacterial coating. This may be a coating, for example, which contains silver ions or releases silver ions.

Alternatively, there is the option of manufacturing the electrodes at least in part from plastic material, wherein the plastic material possesses a settable electrical conductivity. This allows the distribution of the current flow across the imaginary plane formed by the individual electrodes to be predefined. A consequence hereof is a uniform, improved heating, in particular in the edge areas of a sausage-shaped material to be treated.

Apart from the mentioned needle comb electrodes, individual electrodes may also be employed. The selection and use of the electrodes are performed in consideration of the specific dimensions of the material to be treated. In the field of sausages and hot dogs, for example, individual electrodes may be preferably used.

In a continuous manufacturing process, processing of foodstuffs not enclosed by a casing may also be performed. The mentioned belts or pipes surround the material to be treated during the treatment process so that a casing is no longer necessary. It should be mentioned at this point that the belt itself may be heated or moistened or sprayed with liquid smoke or other taste influencing agents so as to achieve a transmission of these components to the material to be treated.

In the context of extensive experiments, it has been moreover shown that the presence of electrical energy in the form of alternating current of higher frequencies is decisive for the success of uniform heating and protein denaturation.

During the resistive heating by means of high-frequency alternating current, the various ingredients of the foodstuff to be treated experience different vibrational stimulation. Apart from the classical resistance heating, particle stimulation in the material to be treated is achieved according to the invention by high-frequency vibrations. The consequence is that friction heat is generated in addition between the ingredients and the particles, which improves the overall heating of the material to be treated. High-frequency vibrations in the range of substantially 5 to 50 MHz entail relative movements of the particles in the filling material with the previously mentioned effect of additional heating, what hitherto has not been known in this form and has not been used at least for the methods of relevance here for treating foodstuffs.

The effect of resistive heating for a uniform and fast heating of foodstuff products on the basis of the findings according to the invention is due to the fact that the conductive ingredients get into a natural vibration due to the permanently changing frequencies of the alternating current. These relative movements result in a heating of the material to be treated.

Tests with 50 Hz alternating current have revealed that the heating that can definitely be ascertained but is of a very slowly progress, is due to the resistance heating of the material to be treated.

For accelerating the heating process, the frequency of the alternating current carried through the product can be increased. Tests have shown that up to substantially 16 kHz, gas formations at the electrodes can be observed. From substantially 17 kHz, such a gas formation can no longer be observed.

Products heated by means of resistive heating in an open sheathing, may also be exposed to frequencies of below 17 kHz since the developing gas vanishes in this case. After a prolonged use of the electrodes, however, traces of ageing can be found on them.

Completely closed sheathings may easily be treated with success only with frequencies of substantially 17 kHz and more.

The mentioned gas formation does not occur abruptly but develops during the treatment period.

According to the invention, the target of the treatment of products by means of resistive heating using high-frequency alternating current is a very rapid, uniform and quality-enhancing treatment.

The heating of bars for the production of scalded sausage may be mentioned here as an example.

With a diameter of about 10 cm and a length of about 60 cm, such a product is heated at present in a boiling cabinet or an open water bath over a period of approximately one hour. Due to the resistive heating using high-frequency alternating current according to the invention, heating occurred in approximately about 5 minutes.

While referring to the employed puncture electrodes, the method of resistive heating may also be used in the event of treatment material filled into cartridges, when the corresponding electrodes are introduced through predefined openings in the cartridge. Puncture electrodes may in this case be embedded in guiding troughs of the closures so that the proportion of the material to be treated, which possibly is not heated sufficiently, remains low.

The explained method primarily is focused on treating a foodstuff in the actual production or processing process.

The principle of the puncturing electrode, however, may basically also be applied for heating all pasty foodstuffs but also of already prepared soups or meat as quasi solid matter. In such a case, it is appropriate for the electrodes not to have peaks concentrating field strength. A ball molded or formed at the end of the electrode could be advantageous here. In this case, the electrodes, for example, suspended on a belt or chain, could heat the material to be treated quasi while passing. The current supply to the electrodes may be realized in this case via the chains or belts accommodating the electrodes.

BRIEF DESCRIPTION OF THE DRAWINGS

The invention will be explained hereinafter in more detail by means of an exemplary embodiment and with reference to Figures.

Shown are in.

DETAILED DESCRIPTION

Figure 1:
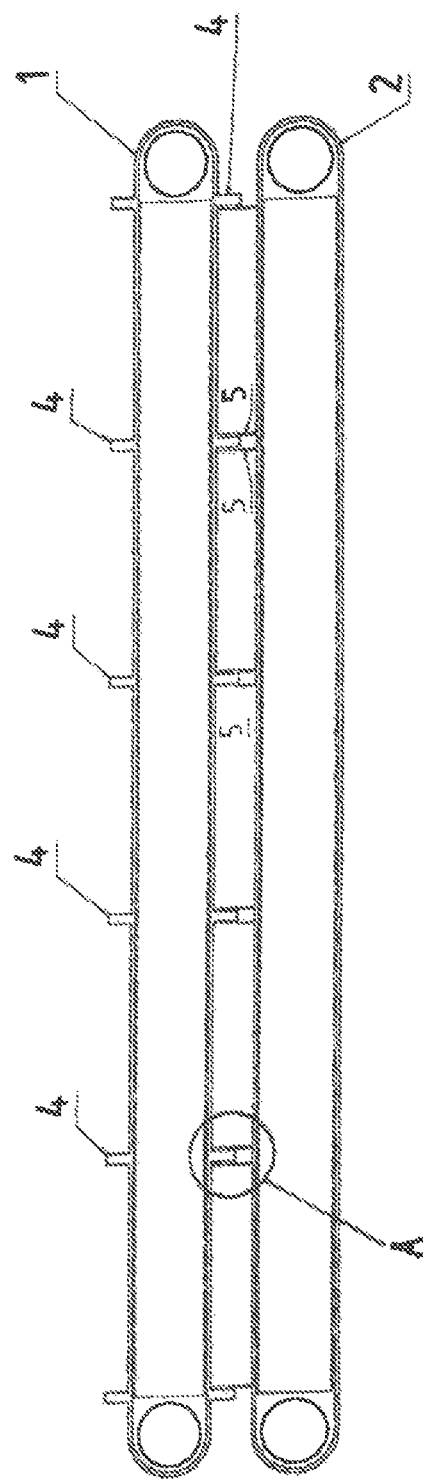
FIG. 1 a side view of a device according to the invention for receiving a sausage product in continuous production.

The representation according to FIG. 1 shows a side view of the device according to the invention for continuous production and resistive treatment of sausage products.

In this case, two conveyor belts 1; 2 guided by rolls and having a space between them are taken as a basis.

The space serves to accommodate the sausage product 3, that is to say the material to be treated.

In the example shown, the upper conveyor belt 1 is provided with a plurality of tappets 4.

Figure 3:
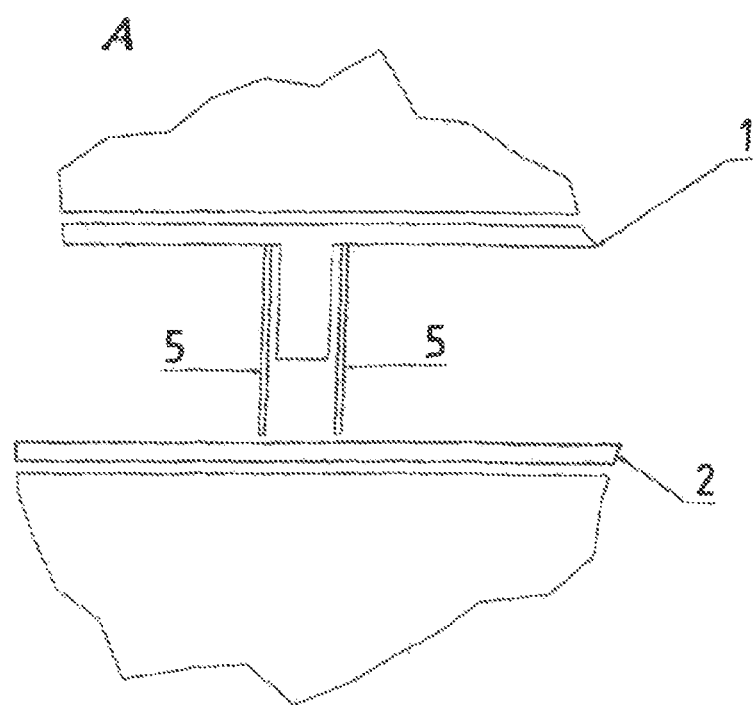
FIGS. 3 and 4 detailed representations of exemplary needle electrodes and tappets.

Furthermore, the needle electrodes 5 according to the invention are visible (see also FIG. 3, detail A).

Figure 2:
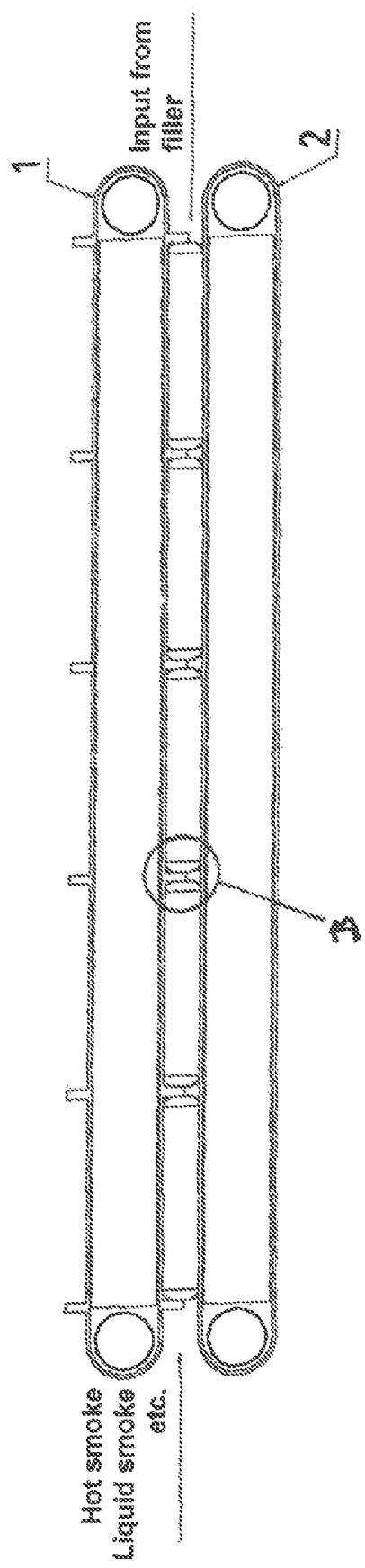
FIGS. 2 and 5 a representation similar to that according to FIG. 1 but with an already received sausage product accommodated between the conveyor belts.

FIG. 2 shows an embodiment in a side view similar to that according to FIG. 1 but with already received sausages to be treated by resistive heating which sausages are provided by a filler device at the input side.

At the output side, a treatment with hot smoke, liquid smoke or similar agents may take place.

Figure 4:
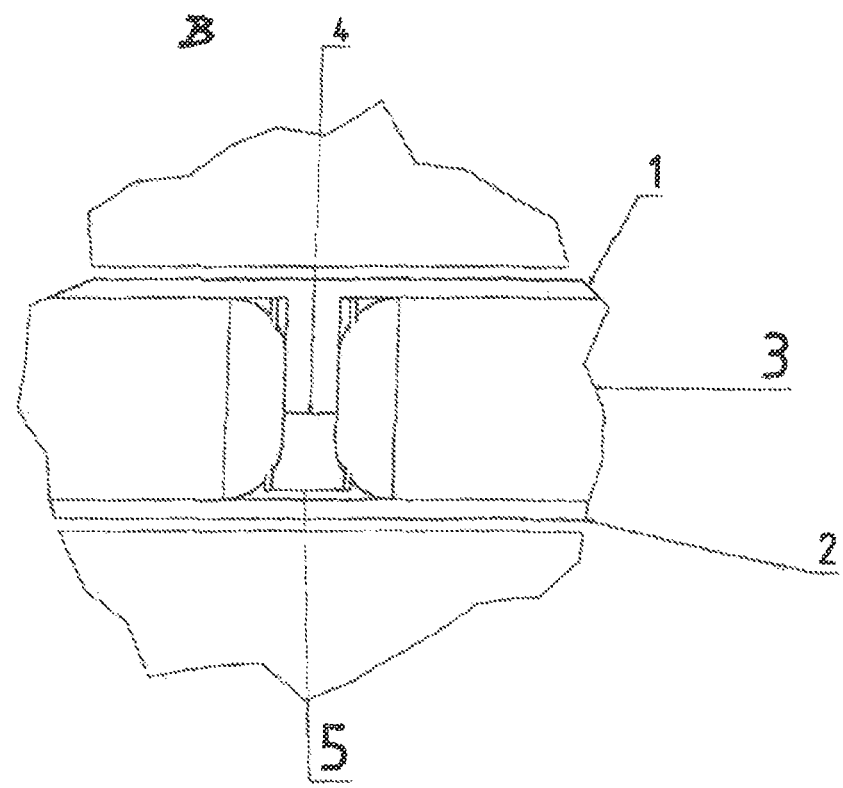

As can be understood by means of the detailed representation B, that is to say FIG. 4, the needle electrode 5 punctures the sausage sheathing, that is to say the skin of the product 3 to be treated in the end cap regions thereof so that the desired resistive heating can then be performed during the length of time the sausage product stays within the treatment apparatus.

Figure 5:
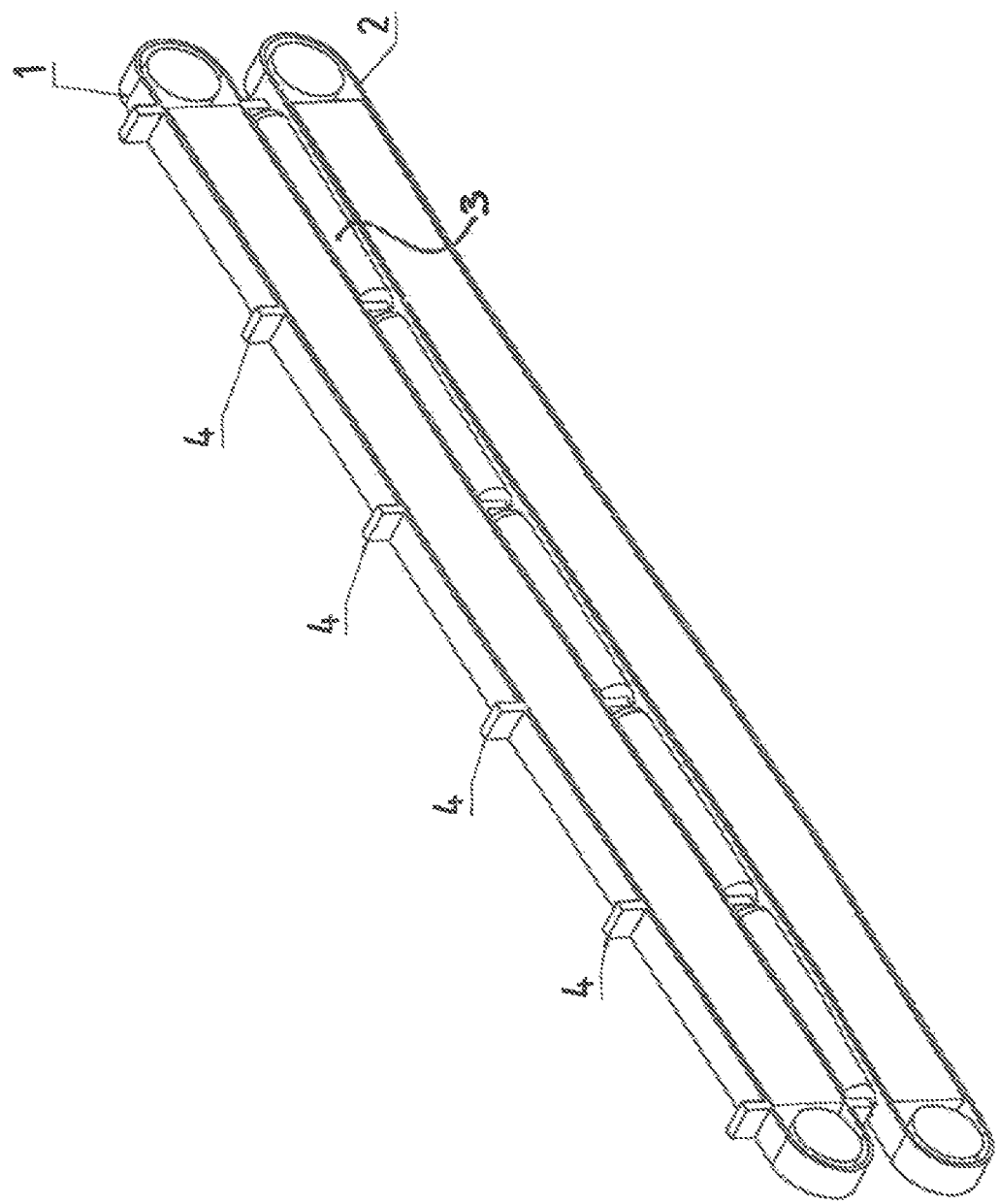

The perspective representation according to FIG. 5 once again illustrates the treatment process with the sausage products received within the continuous treatment device.

It is in the sense of the invention that a plurality of single belts can be combined lying adjacent next to one another so as to increase the product throughput.

Imaginable are also belts of larger width, each receiving a plurality of products lying in parallel next to one another, wherein the number of needle electrodes or needle com electrodes then needs to be adapted correspondingly, which, however, is within the usual constructive consideration of the skilled person.

As illustrated in FIG. 4, the puncturing proceeds such that the tips of the needle comb electrodes 5 exit again from the foodstuffs to be treated, that is to say the sausage product 3, for example. This, in contrast to the approaches of the state of the art, preferably not only piercing but penetrating is performed with regard to the product.

In the example shown, the needle electrodes 5 of the respective needle group are pierced substantially perpendicular to the longitudinal axis the product 3 to be treated and through it. This kind of penetrating has been revealed to be particularly advantageous. Of course, it is in the sense of the invention to also deviate from the perpendicular penetration direction.

The advantage of the electrode groups with needle comb electrodes employed according to the invention is that compared to planar electrodes, interfering isolating interspaces cannot develop, for example by gas formation or gas deposits. The consequence is a particularly uniform and more rapid heating of the material to be treated without undesired hot spots.

The number of the needle comb electrodes of the needle comb, for example, may be in the range from five to fifteen and be adapted or matched to the diameter of the material to be treated.

What is claimed is:

1. A method for treating a food product having a material to be treated accommodated within one of an insulating encapsulation or a sheathing, the method comprising:
    bringing the food product into contact with spaced-apart electrically conductive first and second electrodes, each electrode having a comb-like set of needles, wherein the electrodes have a distance from one another in relation to the material to be treated, wherein the electrodes are configured and arranged for penetrating through the one of the insulating encapsulation or the sheathing to one of puncture the material to be treated or move the electrodes while penetrating through the one of the insulating encapsulation or the sheathing to puncture the material to be treated;
    rotationally moving a needle of the first electrode about an axis of the needle during the penetration;
    rotating the needle in a respective directionally changed rotational movement during removal of the first electrode; and
    regulating a power source of alternating current having a predetermined frequency through the electrodes by dividing a heating of the food product into temporal sections based on the food product heating to a predetermined temperature.

2. The method according to claim 1, wherein the material to be treated is accommodated in a space between two conveyor belts and wherein the electrodes extend from at least one of the conveyor belts toward an opposite conveyor belt.

3. The method according to claim 1 further comprising: pricking the first electrode into an end area of the sheathing to produce a puncture, wherein the sheathing is flexible.

4. The method according to claim 3, further comprising: closing a remaining inlet in the material to be treated after removal of the electrodes from the material to be treated.

5. The method according to claim 4, wherein the closing of the remaining inlet further comprises:
    employing one of a resetting, self-healing film material or the sheathing having at least sections of the resetting, self-healing material.

6. The method according to claim 1, wherein the predetermined frequency of the power source is greater than 16 kHz, and wherein resistive heating is performed at least until coagulation of the food product.

7. The method according to claim 1, further comprising: post-treating the food product at least in edge areas of the material to be treated using infrared radiation.

8. The method according to claim 1, wherein the electrodes are formed as hollow electrodes, and wherein a hollow electrode space receives and carries an agent selected from one of a temperature control agent or a cooling agent.

9. The method according to claim 1, wherein the first electrode includes a grid electrode.

10. The method according to claim 1, wherein the penetration is performed in a manner supported by ultrasound.

11. The method according to claim 1, wherein the regulating of the power source of high-frequency alternating current is performed in a stepwise manner with interposed holding times.

12. The method according to claim 1, wherein the first electrode has an integrated temperature sensor.

13. The method according to claim 1, wherein the electrodes are made of an electrically conductive plastic material.

14. The method according to claim 1, wherein an electrical conductivity of the electrodes is settable.

15. The method according to claim 14, wherein the conductivity of the electrodes can be set to be different from one electrode to the next.

16. The method according to claim 1, wherein prior to the electrodes penetrating the material to be treated, a shell for shaping the material to be treated is configured and arranged to build a separating layer between the material to be treated and the electrodes, wherein the shell is formed to be cap-shaped and has electrical characteristics corresponding to those of the material to be treated.

17. The method according to claim 1, wherein regulating of the power source of high-frequency alternating current, further comprises:

continuing resistive heating beyond starting protein denaturation caused by heating with an objective of permanently stopping proceeding with biochemical processes.

18. A method for treating a food product, the method comprising:
bringing the food product into contact with spaced-apart electrically conductive groups of electrodes, the food product having a material to be treated accommodated within one of an insulating encapsulation or a sheathing, wherein the groups of electrodes have a first distance from one another in relation to the material to be treated, wherein each group of electrodes includes a comb-like set of needles having a second distance from each other, wherein the first distance is larger than or equal to the second distance, wherein the groups of electrodes are configured and arranged for penetrating through the one of the insulating encapsulation or the sheathing to puncture the material to be treated;
rotationally moving a needle of the group of electrodes about an axis of the needle during the penetration;
rotating the needle in a respective directionally changed rotational movement during removal of the group of electrodes; and
regulating a power source of alternating current through the electrodes by dividing a heating of the food product into temporal sections based on the food product heating to a predetermined temperature.

19. A method comprising:
bringing a food product having a flexible casing of a material to be treated into contact with spaced-apart electrically conductive groups of electrodes to treat the food product, wherein the groups of electrodes have a first distance from one another in relation to the material to be treated, wherein each group of electrodes includes a comb-like set of needles having a second distance from one another, wherein the groups of electrodes are configured and arranged for penetrating through the flexible casing to puncture the material to be treated;
pricking a first electrode group into an end area of the flexible casing to produce a puncture, wherein the material to be treated is accommodated in a space between two conveyor belts;
rotationally moving a needle of the first electrode group about an axis of the needle during the pricking;
rotating the needle in a respective directionally changed rotational movement during removal of the first electrode group; and
regulating a power source of alternating current through the electrodes by dividing a heating of the food product into temporal sections, wherein during a first temporal section the food product is heated to first temperature and after an interruption the food product is heated to a second temperature during a second temporal section.

* * * * *